(12) United States Patent
Padmanabhan et al.

(10) Patent No.: US 10,657,458 B2
(45) Date of Patent: May 19, 2020

(54) METHOD AND SYSTEM FOR FORECASTING

(71) Applicant: InMobi PTE LTD., Singapore (SG)

(72) Inventors: Swaminathan Padmanabhan, Chennai (IN); Anand Sharma, Indore (IN)

(73) Assignee: InMobi PTE LTD., Singapore (SG)

( * ) Notice: Subject to any disclaimer, the term of this patent is extended or adjusted under 35 U.S.C. 154(b) by 513 days.

(21) Appl. No.: 14/748,539

(22) Filed: Jun. 24, 2015

(65) Prior Publication Data

US 2015/0379412 A1   Dec. 31, 2015

(30) Foreign Application Priority Data

Jun. 25, 2014   (IN) .......................... 3081/CHE/2014

(51) Int. Cl.
*G06N 20/00*   (2019.01)

(52) U.S. Cl.
CPC .................................. *G06N 20/00* (2019.01)

(58) Field of Classification Search
CPC ........ G06N 99/005; G06N 3/08; G06N 7/005; G06N 3/086
See application file for complete search history.

(56) References Cited

U.S. PATENT DOCUMENTS

| | | | |
|---|---|---|---|
| 6,622,134 B1 * | 9/2003 | Sorkin .................... | G06F 21/56 706/12 |
| 7,349,823 B2 | 3/2008 | Whisnant et al. | |
| 7,702,053 B2 | 4/2010 | Chen et al. | |
| 8,358,839 B2 | 1/2013 | Monga et al. | |
| 8,756,175 B1 * | 6/2014 | Szegedy .............. | G06N 99/005 706/12 |
| 8,909,564 B1 * | 12/2014 | Kaplow .............. | G06N 99/005 706/12 |

(Continued)

OTHER PUBLICATIONS

Biing-Hwang Juang, Wu Chou, and Chin-Hui Lee, "Minimum Classification Error Rate Methods for Speech Recognition", May 1997, IEEE Transactions on Speech and Audio Processing, vol. 5 No. 3, pp. 257-265.*

(Continued)

*Primary Examiner* — Kamran Afshar
*Assistant Examiner* — Ying Yu Chen

(57) ABSTRACT

The present invention provides a forecasting engine with the ability to minimize prediction error in a preferred direction. It comprises of a receiver configured to receive training data samples. In addition, the forecasting engine includes a building module configured to build a base learner model from the training data samples. In addition, the forecasting engine includes a custom error function that emphasizes prediction error along a pre-configured direction. In addition, the forecasting engine includes an error determination module configured to determine the prediction error made by the base learner model. In addition, the forecasting engine includes an error minimization module configured to construct a new model that has lesser prediction error than the base learner model, where prediction error is as defined by the custom error function. In addition, the forecasting engine includes an iteration module that manages multiple iterations of the error determination module and the error minimization module.

18 Claims, 3 Drawing Sheets

(56) References Cited

U.S. PATENT DOCUMENTS

2008/0133434 A1* 6/2008 Asar ................... G06N 99/005
706/12

OTHER PUBLICATIONS

Roberto Paredes and Enrique Vidal, "Learning prototypes and distances: A prototype reduction technique based on nearest neighbor error minimization", Feb. 2006, Pattern Recognition vol. 39, Issue 2, pp. 180-188.*

Andrew P. Bradley, "The Use of the Area Under the ROC Curve in the Evaluation of Machine Learning Algorithms", 1997, Pattern Recognition, vol. 30, No. 7, pp. 1145-1159. (Year: 1997).*

Ahmed H. Elsheikh, Reza Tavakoli, Mary F. Wheeler, and Ibrahim Hoteit, "Boosting iterative stochastic ensemble method for nonlinear calibration of subsurface flow models", Feb. 26, 2013, Comput. Methods Appl. Mech. Engrg. 259 (2013), pp. 10-23. (Year: 2013).*

* cited by examiner

METHOD AND SYSTEM FOR FORECASTING

FIELD OF THE INVENTION

The present invention relates to forecasting techniques. In particular, the invention relates to error minimization in forecasting techniques.

BACKGROUND

Forecasting or prediction is a very important activity in economics, commerce, and various branches of science. Forecasting is the process of predicting the outcomes of events that have not yet occurred. Forecasting can be done by various methods. One such method uses regression analysis. Regression analysis is a statistical analysis technique, which can be used to model a real valued target variable as a function of one or more real valued input attributes.

In several forecasting or prediction applications, it is seen that prediction errors in one direction are more tolerable than the other. For instance, while processing a credit card suitability or loan suitability screening application, a bank might feel that false positives are extremely dangerous, while false negatives are tolerable. That is, giving a credit card or a loan to a person who does not qualify for it, is relatively more dangerous than refusing a credit card or a loan to a person who might have marginally qualified for it. That is, over predicting the suitability score in a loan application is relatively more dangerous as compared to under predicting it.

U.S. Pat. No. 7,349,823 B2 describes a method for optimizing the regression model used for prediction of a signal as a function of a set of available signals using more than one regression model. This method includes receiving training data sets from the set of available signals. Further, it includes initializing a set of regression models, which includes at least two regression models. In addition, the method includes creating a genetic offspring of the set of regression models. However, this method does not reduce the error present in the set of available signals. As a result, the deviation in the forecasted values is high.

U.S. Pat. No. 7,702,053 B2 describes a device for error calculation. The device includes an error calculation circuit configured to determine the error present in a signal. Further, it includes a processing circuit configured to adjust the signal in accordance with the coefficients of the processing circuit. In addition, it includes a dithering circuit configured to adjust the coefficients of the processing circuit. However, this device uses only one model to reduce the error. As a result, the error minimized is to a lesser degree.

In light of the above discussion, there is a need for a method and a system to minimize prediction errors in a preferred direction, thereby penalizing one of over prediction or under prediction higher than the other.

SUMMARY

The present invention provides a forecasting engine with the ability to minimize prediction error in a preferred direction. It includes a receiver configured to receive training data samples. Each training data sample comprises of input attributes and a target value. The forecasting engine learns a mapping between the input attributes and the target value, such that prediction errors along the pre-configured preferred direction are minimized. The direction in which the error is to be minimized is chosen as one of positive or negative direction. In addition, the forecasting engine includes a building module configured to build a base learner model. The base learner model is configured to predict the target value as a function of the input attributes. In addition, the forecasting engine uses a custom error function to measure the prediction error made by the base learner. The custom error function emphasizes prediction error along a pre-configured preferred direction, the direction is chosen so as to emphasize one of a positive direction or negative direction. In addition, the forecasting engine includes an error determination module configured to determine the prediction error made by the base learner model on an independent test dataset. In addition, the forecasting engine includes an error minimization module configured to construct a new model which has lesser prediction error than the base learner, where the prediction error is as defined by the custom error function. Said error minimization is emphasized in one of positive direction or negative direction, as determined by the custom error function. This new model is the output of the current iteration of the forecasting engine, and it becomes the base learner in the next iteration. The forecasting engine includes an iteration module which manages multiple iterations of the error determination module and the error minimization module. The iteration module continues to iterate until a model with least prediction error is obtained.

The error determination module obtains a test dataset which is different from the training data used for building the base learner. The error determination module evaluates the error made by the base learner on the test dataset. The error includes two factors namely a squared error term and a sigmoid function. The squared error term is used as a measure of the magnitude of the error made by the base learner. The sigmoid function is used to emphasize error in a particular direction, namely positive direction or negative direction. In addition, the sigmoid function is always range bound between 0 and 1, as a result, it provides a mapping from real line to a unit interval between 0 and 1. Hence, the sigmoid function applies a multiplicative weight between 0 and 1 to each error value as measured by the squared error function, with the magnitude of the weight varying based on the direction of the error. If positive error is to be minimized, then the data samples having positive error are weighted greater and the data samples having negative error are weighted lesser by the sigmoid function.

In another aspect, the present invention provides a computer program product for use with a computer, the computer program product comprising a computer usable medium having a computer readable program code embodied therein for forecasting. The computer program code receives input training data samples, each of which comprise of a set of input attributes and a target value which has to be modelled. The code builds a base learner module, which is configured to predict the target value as a function of the input attributes. Moreover, the code performs error determination for the base learner on an independent test dataset of samples. Furthermore, the code performs error reduction by constructing a new model which has lesser prediction error than the base learner, while in the process, penalizing either under prediction or over prediction. This is accomplished by differentiating the error with respect to the base learner model, and by moving the base learner in the direction against the direction of the derivative. This new model becomes the base learner for the next iteration. The iteration process is repeated till the errors converge, i.e. till the model cannot be made any better.

DETAILED DESCRIPTION OF THE DRAWINGS

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
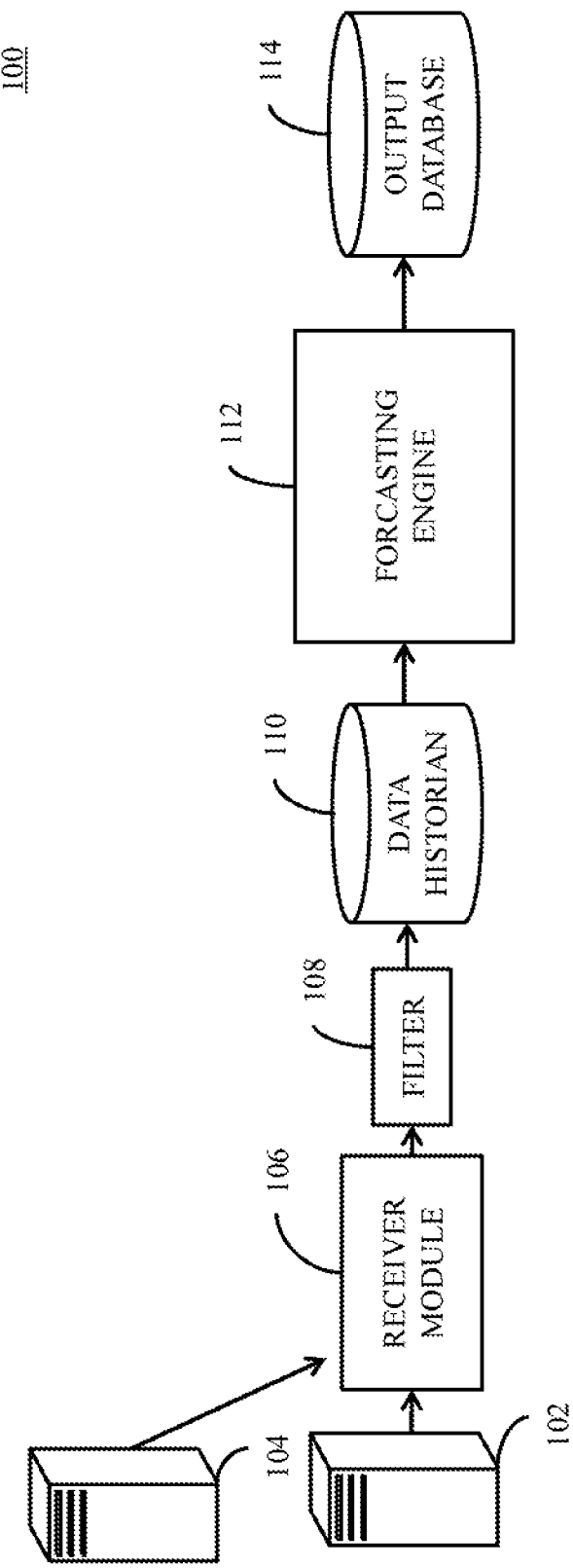
FIG. 1 illustrates the overall architecture of a forecasting engine for minimizing prediction error in a preferred direction, in accordance with embodiments of the present invention.

FIG. 1 illustrates a forecasting system 100 for minimizing prediction error in a preferred direction, in accordance with embodiments of the invention. The system 100 includes an application server 102 and an application server 104. The application server 102 and the application server 104 perform various domain specific operations. The application server 102 and the application server 104 maintain logs relating to the operations performed.

In an embodiment, the application server 102 and the application server 104 are advertisement servers, which maintain the record of the click through rates of a particular advertisement served to the plurality of websites. In another embodiment, the application server 102 and the application server 104 are banking servers, which maintain a record of the credit scores of a plurality of customers. In yet another embodiment, the application server 102 and the application server 104 are tourism management servers, which maintain a record of the frequency of visits by tourists to a tourist destination.

Examples of logs maintained by the application server 102 and the application server 104 include but may not be limited to changes in credit scores of a plurality of customers, the number of advertisements published on a plurality of websites on a daily basis and the like. A receiver module 106 interacts with the application server 102 and the application server 104 to collect the data. In context of the present invention, the receiver module 106 collects the required type of data from various types of data stored in the application server 102. The data collected by the receiver module 106 is further cleaned by a filter 108.

In context of the present invention, the filter 108 sorts and removes data entries according to a predetermined requirement. In an embodiment, the receiver module 106 collects the data regarding advertisements published on a plurality of websites. The filter 108 cleans the data collected by the receiver module 106 by removing advertisements published before a predetermined time on a predetermined date.

A data historian 110, coupled to the filter 108, stores the filtered data. The data historian 110 is a database that stores history of process data. In an embodiment, the data historian 110 is a database that stores data pertaining to advertisements published on a plurality of websites, published before a predetermined time on a predetermined date.

The data historian 110 is coupled to a forecasting engine 112. The forecasting engine 112 is configured and trained to minimize prediction errors in a preferred direction, and is used to predict values using data obtained from the data historian 110. The direction of the error is defined as the sign of (predicted target value—true target value). In an embodiment, the forecasting engine 112 predicts a set of loan suitability scores based on data samples obtained from the data historian 110, and stores the forecasted values in an output database 114.

Figure 2:
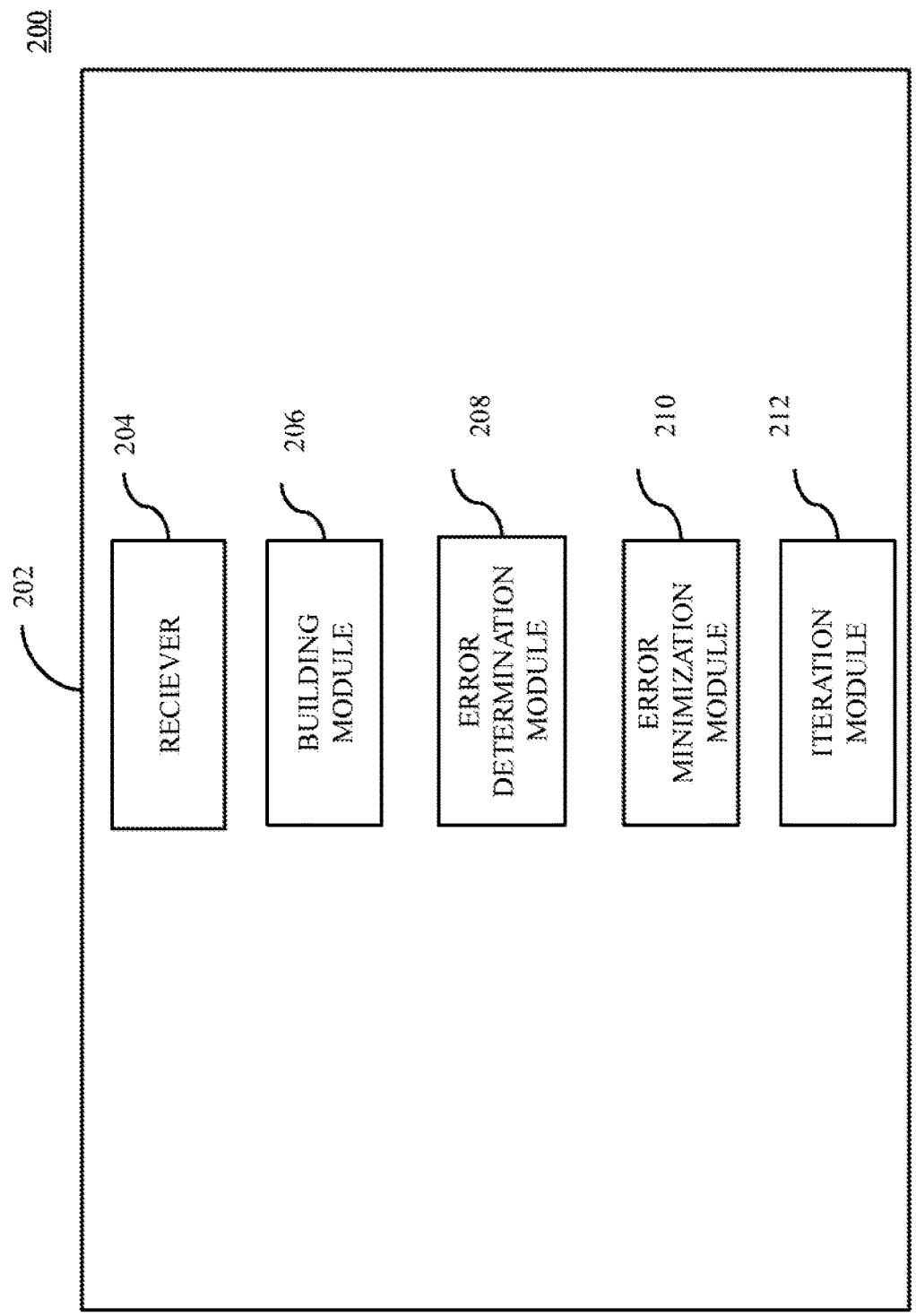
FIG. 2 illustrates the different modules involved in training a forecasting engine for minimizing prediction error in a preferred direction, in accordance with embodiments of the present invention.

FIG. 2 illustrates a block diagram 200 of the different modules involved in training the forecasting engine 202 for minimizing prediction error in a preferred direction, in accordance with embodiments of the present invention. The functions and capabilities of the forecasting engine 202 are the same as the functions and capabilities of 112. The forecasting engine 202 includes a receiver 204. The receiver 204 is configured to receive training data samples. Each training data sample includes input attributes and a target value. The input attributes include but may not be limited to multiple data points, time series data and the like. In an embodiment, the input attributes comprise of attributes such as color, size of a particular advertisement published on a particular website, and the target value relates to the click through rate. In another embodiment, the input attributes include but may not be limited to age, savings account balance of a particular customer of a particular bank, and the target value relates to the loan suitability score.

The receiver 204 is coupled to the building module 206. The building module is configured to build a base learner model. The base learner model is configured to predict the target value as a function of the input attributes. The examples of the base learner module include but may not be limited to regression tree, generalized linear models, and the like. The building module 206 is coupled to the error determination module 208.

The error determination module receives a test dataset which is different from the training data samples used for building the base learner. The error determination module evaluates the prediction error made by the base learner on the test dataset. The error determination module 208 calculates error as defined by the following error function.

$$E = \sum_i (x_i - f_0(Input_i))^2 * \frac{e^{c(x_i - f_0(Input_i))}}{1 + e^{c(x_i - f_0(Input_i))}}$$

The equation includes two factors namely a squared error term and a sigmoid function. Here, i is a test data sample, $X_i$ is the target value in the test dataset, and $f_0(input_i)$ is the predicted target value corresponding to it. The squared error term is given by $(x_i - f_0(Input_i))^2$ The sigmoid function is given by $$\frac{e^{c(x_i - f_0(Input_i))}}{1 + e^{c(x_i - f_0(Input_i))}}$$

The sigmoid function is used to lead the error minimization in a particular direction. The sigmoid function is always range bound between 0 and 1, and as a result, it provides a mapping from real line to the unit interval between 0 and 1. The sigmoid function applies a multiplicative weight between 0 and 1 to each error value as measured by the squared error function, with the magnitude of the weight varying based on the direction of the error. If positive error is to be minimized, then the data samples having positive error are weighted greater and the data samples having negative error are weighted lesser. It is to be noted that the sigmoid function mentioned above emphasizes the error in negative direction. That is, it emphasizes minimization of error where the predicted value is lesser than the true observed value. Hence, negative errors when $f_0(Input_i)<x_i$ have higher weight. This makes the resultant model less tolerant towards under prediction. A person skilled in the art will be able appreciate that in order to emphasize towards errors in the positive direction, the following change must be made in the sigmoid term:

$$\frac{e^{c(f_0(Input_i)-x_i)}}{1+e^{c(f_0(Input_i)-x_i)}}$$

In addition, similar changes must be reciprocated in all the equations mentioned, in order to emphasize error correction in the positive direction.

The error determination module 208 is coupled to the error minimization module 210. The error minimization module 210 is configured to minimize the error present in the set of predicted values, in the direction emphasized by the sigmoid. The minimization module 210 reduces the prediction error made by model $f_0$, by computing the derivative of the error function E w.r.t the model $f_0$, and generates a new model $f_1$, where $$f_1 = \left(f_0 - \gamma \cdot \frac{d}{df_0()}E\right).$$

The derivative is given by the equation below:

$$\frac{d}{df_0()}E = \frac{(x_i - f_0(Input_i)) * e^{c(x_i - f_0(Input_i))} * (2e^{c(x_i - f_0(Input_i))} + cx_i - cf_0(Input_i) + 2)}{(e^{c(x_i - f_0(Input_i))} + 1)^2}$$

γ is the learning rate, which is chosen as a constant value. This constant value is chosen such that it results in the highest reduction in error from $f_0$ to $f_1$. $E_0$ is the test error made by the base learner $f_0$ and $E_1$ is the test error made by the model $f_1$. The value of γ is chosen so as to maximize $(E_0-E_1)$.

In the next iteration, the model $f_1$ becomes the new base learner. The forecasting engine includes an iteration module which manages multiple iterations of the error determination module and the error minimization module. The iteration module continues to iterate till further iterations do not produce any models with lesser errors.

In the embodiment where the learning algorithms are regression trees, a new regression tree is trained to predict $$\gamma \cdot \frac{d}{df_0()}E$$

as a function of the input $X_i$, and this tree is combined with the base learner to produce $f_1$ as $$f_1 = \left(f_0 - \gamma \cdot \frac{d}{df_0()}E\right).$$

Figure 3:
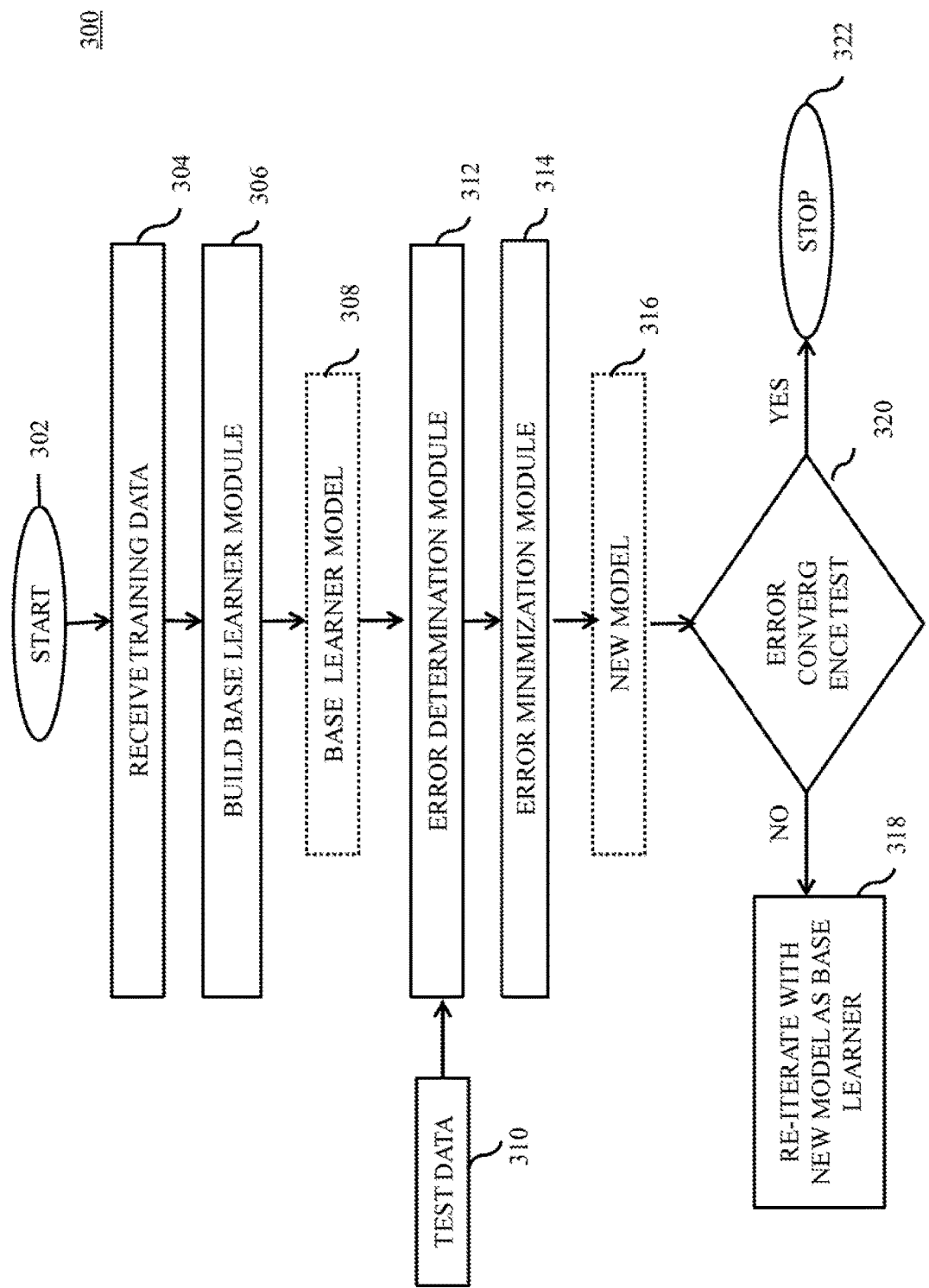
FIG. 3 illustrates a flowchart for minimizing prediction error in a preferred direction in a forecasting technique, in accordance with embodiments of the present invention.

FIG. 3 illustrates a flowchart 300 for minimizing prediction error in a preferred direction in a forecasting technique, in accordance with embodiments of the present invention. The flowchart 300 initiates at step 302. At step 304, the forecasting engine 112 receives training data samples. As mentioned above, the training data samples include but may not be limited to multiple data points, time series data and the like. In an embodiment, the input attributes comprise of attributes such as color, size of a particular advertisement published on a particular website, and the target value relates to the click through rate. In another embodiment, the input attributes comprise of attributes such as age, savings account balance of a particular customer of a particular bank, and the target value relates to the loan suitability score.

At step 306, a base learner model 308 is built. As mentioned above, the base learner model is used to predict the target value as a function of the input attributes. The examples of the base learner module include but may not be limited to regression tree, generalized linear models, and the like. At step 312, prediction error made by the base learner model 308 on a test dataset 310 is determined, wherein the error is as defined by the custom error function E described in the body of this invention.

At step 314, error minimization is achieved by constructing a new model which has lesser prediction error than the base learner. The error minimization process is described in the body of this invention. The process of flowchart 300 performs error reduction by constructing a new model 316 which has lesser prediction error than the base learner, while in the process, penalizing either under prediction or over prediction. This is accomplished by differentiating the error with respect to the base learner model 308, and by moving the base learner model 308 in the direction against the direction of the derivative. The error minimization module 314 is configured to construct a new model 316 which has lesser prediction error than the base learner model 308. After step 314, an iteration module (not shown) is configured to manage multiple iterations of the error determination module and the error minimization module. In the error convergence test 320, if the prediction error of the new model 316 and the prediction error of the base learner model 308 do not converge, the new model 316 becomes the base learner model 308 for the next iteration. The iteration process is repeated until the prediction errors of the new model 316 and the base learner model 308 converge, and the process stops at element 322.

The present invention is able to reduce the prediction error in a preferred direction. Such a system can be used in a bank to determine the credibility of a loan seeker. For instance, while processing a credit card suitability or loan suitability screening application, some banks might feel that false positives are extremely dangerous, while false negatives are tolerable. That is, giving a credit card or a loan to a person who does not qualify for it, is relatively more dangerous than refusing a credit card or a loan to a person who might have marginally qualified for it. That is, over predicting the suitability score in a loan application is relatively more dangerous than under predicting it. It should be noted that for a different bank, the requirement could be reversed. The present invention can also handle the reverse case, by emphasizing more against under prediction, as compared to over prediction.

This written description uses examples to describe the subject matter herein, including the best mode, and to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A forecasting engine comprising:
   a processor; and
   a memory, coupled to the processor, that includes code stored therein that is executable by the processor to implement:
   a. a receiver configured to receive training data samples, wherein each sample consists of a set of input attributes and a target value;
   b. a base learner model configured to, in accordance with an error function, generate predicted target values that predict the target value as a function of the input attributes and generates prediction errors representing errors between the predicted target values and the received target values;
   c. the error function which generates the prediction errors and emphasizes each prediction error along a pre-configured preferred direction, wherein the direction is chosen in at least one of a positive and a negative direction as a sign between the predicted target value and the target value received with the training data samples and for each training data sample, the error function weights the prediction errors with greater weight for prediction errors in the pre-configured preferred direction;
   d. an error determination module configured to apply the error function to determine the prediction error made by the base learner model on an independent test dataset;
   e. an error minimization module configured to construct a new model which has a lesser prediction error than the base learner model, wherein:
      the prediction error is defined by the error function that emphasizes minimization of the prediction error so that a predicted value is less than a true observed value; and
      to construct the new model comprises:
         differentiating the prediction error with respect to the base learner model to determine a derivative of the prediction error with respect to the base learner model; and
         generating the new model by moving the base learner model in a direction against a direction of the derivative;
   f. an iteration module configured to manage multiple iterations of the error determination module and the error minimization module, wherein the iteration module continues to iterate until further iterations of the prediction error of the new model is minimized; and
   g. an error convergence module to provide the new model as the base learner model in element b. for construction of another model and provide the new model to a system to process data to generate results that trend to false negative over false positive results in accordance with the pre-configured preferred direction.

2. The forecasting engine as claimed in claim 1, comprising a correction module configured to correct the prediction error.

3. The forecasting engine as claimed in claim 2, wherein the error determination module and error minimization module are run in a loop in order to iteratively reduce the error.

4. The forecasting engine as claimed in claim 1, wherein the base learner module is configured to predict the target value as a function of the input attributes is a regression analysis module.

5. The forecasting engine as claimed in claim 1, wherein the error determination module uses a sigmoid function to lead the error minimization in a pre-configured direction.

6. The forecasting engine as claimed in claim 1, wherein a differentiation technique is used for constructing the new model from the base learner model, which has a lesser error than the base learner model as defined by the error function.

7. A non-transitory, computer program product for use with a computer, the computer program product comprising a non-transitory, computer usable medium having computer readable program code embodied therein for minimizing prediction error in a preferred direction in a forecasting technique, when executed by the computer the computer program code comprising:
   a. a receiving module configured to receive training data samples, wherein each sample consists of a set of input attributes and a target value;
   b. a base learner model configured to, in accordance with an error function, generate predicted target values that predict the target value as a function of the input attributes and generates prediction errors representing errors between the predicted target values and the received target values;
   c. the error function which generates the prediction errors and emphasizes each prediction error along a pre-configured preferred direction, wherein the direction is chosen in at least one of the positive direction and a negative direction as a sign between the predicted target value and the target value received with the training data samples and for each training data sample, the error function weights the prediction errors with greater weight for prediction errors in the pre-configured preferred direction;
   d. an error determination module configured to apply the error function to determine the prediction error made by the base learner model on an independent test dataset;
   h. an error minimization module configured to construct a new model which has a lesser prediction error than the base learner model, wherein:
      the prediction error is defined by the error function that emphasizes minimization of the prediction error so that a predicted value is less than a true observed value; and
      to construct the new model comprises:
         differentiating the prediction error with respect to the base learner model to determine a derivative of the prediction error with respect to the base learner model; and
         generating the new model by moving the base learner model in a direction against a direction of the derivative;

e. an iteration module which manages multiple iterations of the error determination module and the error minimization module, wherein the iteration module continues to iterate until further iterations the prediction error of the new model is minimized; and
f. an error convergence module to provide the new model as the base learner model in element b. for construction of another model and provide the new model to a system to process data to generate results that trend to false negative over false positive results in accordance with the pre-configured preferred direction.

8. The computer program product as claimed in claim 7, comprising a correction module configured to correct the prediction error.

9. The computer program product as claimed in claim 8, wherein the error determination module and error minimization module are run in a loop in order to iteratively reduce the error.

10. The computer program product as claimed in claim 7, wherein the base learner module is configured to predict the target value as a function of the input attributes is a regression analysis module.

11. The computer program product as claimed in claim 7, wherein the error determination module uses a sigmoid function to lead the error minimization in a pre-configured direction.

12. The computer program product as claimed in claim 7, wherein a differentiation technique is used for constructing the new model from the base learner model, which has a lesser error than the base learner model as defined by the error function.

13. A method of generating and utilizing a model that emphasizes minimization of a prediction error where a predicted value is less than a true observed value, the method comprising:
performing by a processor executing code in a computer system:
a. receiving training data samples, wherein each sample consists of a set of input attributes and a target value;
b. generating with a base learner model in accordance with an error function, predicted target values that predict the target value as a function of the input attributes and generating prediction errors representing errors between the predicted target values and the received target values;
c. generating prediction errors with the error function that emphasizes prediction error along a pre-configured preferred direction, wherein the direction is chosen in at least one of a positive and a negative direction as a sign between the predicted target value and the target value received with the training data samples and for each training data sample, the error function weights the with greater weight the prediction errors in the pre-configured preferred direction;
d. determining the prediction error made by the base learner model on an independent test dataset;
i. using an error minimization module to construct a new model which has a lesser prediction error than the base learner model, wherein:
the prediction error is defined by the error function that emphasizes minimization of the prediction error so that a predicted value is less than a true observed value; and
to construct the new model comprises:
differentiating the prediction error with respect to the base learner model to determine a derivative of the prediction error with respect to the base learner model; and
generating the new model by moving the base learner model in a direction against a direction of the derivative;
e. using an iteration module to manage multiple iterations, of the error determination module and the error minimization module, wherein the iteration module continues to iterate until further iterations the prediction error of the new model is minimized; and
f. an error convergence module to provide the new model as the base learner model in element b. for construction of another model and provide the new model to a system to process data to generate results that trend to false negative over false positive results in accordance with the pre-configured preferred direction.

14. The method as claimed in claim 13 further comprising:
utilizing a correction module to correct the prediction error.

15. The method as claimed in claim 14 further comprising:
running the error determination module and error minimization module in a loop in order to iteratively reduce the error.

16. The method as claimed in claim 13 further comprising:
predicting the target value as a function of the input attributes is a regression analysis module.

17. The method as claimed in claim 13 further comprising:
using a sigmoid function to lead the error minimization in a pre-configured direction.

18. The method as claimed in claim 13 further comprising:
using a differentiation technique to construct the new model from the base learner model, which has a lesser error than the base learner model as defined by the error function.

* * * * *